United States Patent
Kobayashi et al.

(10) Patent No.: US 8,373,315 B2
(45) Date of Patent: Feb. 12, 2013

(54) LINEAR OSCILLATORY ACTUATOR

(75) Inventors: Noboru Kobayashi, Hikone (JP); Hiroaki Shimizu, Hikone (JP); Kensaku Kanada, Ogaki (JP)

(73) Assignee: Panasonic Corporation, Osaka (JP)

( * ) Notice: Subject to any disclaimer, the term of this patent is extended or adjusted under 35 U.S.C. 154(b) by 22 days.

(21) Appl. No.: 13/217,426

(22) Filed: Aug. 25, 2011

(65) Prior Publication Data

US 2012/0074796 A1 Mar. 29, 2012

(30) Foreign Application Priority Data

Sep. 27, 2010 (JP) ................................. 2010-215488

(51) Int. Cl.
*H02K 33/00* (2006.01)
(52) U.S. Cl. ........................................................ 310/25
(58) Field of Classification Search ................. 310/25, 310/12.04, 12.14, 15, 30, 36
See application file for complete search history.

(56) References Cited

U.S. PATENT DOCUMENTS

| | | | |
|---|---|---|---|
| 6,991,217 B2* | 1/2006 | Shimizu et al. | 251/284 |
| 7,304,407 B2* | 12/2007 | Sanematsu et al. | 310/36 |
| 8,269,379 B2* | 9/2012 | Dong et al. | 310/25 |
| 2009/0096299 A1* | 4/2009 | Ota et al. | 310/25 |
| 2011/0089772 A1* | 4/2011 | Dong et al. | 310/25 |

FOREIGN PATENT DOCUMENTS

JP 2005-354879 12/2005

* cited by examiner

*Primary Examiner* — Nguyen N Hanh
(74) *Attorney, Agent, or Firm* — Greenblum & Bernstein, P.L.C.

(57) ABSTRACT

A linear oscillatory actuator includes a magnetic pole forming portion that includes an electromagnet and a base, magnetic blocks each of which includes a magnet attracted or repelled by the electromagnet to reciprocate, elastic suspensions for supporting the magnetic blocks, and at least one coupling spring portion that couples the magnetic blocks reciprocatably. Each of the elastic suspension includes upper and lower extending portions, and elastic planar portions integrally provided between the upper extending portions and the lower extending portions, respectively. Depressed portions are formed at continuous portions between the upper extending portions and the elastic planar portions, respectively, and each of the depressed portions is depressed toward the magnetic blocks. While the magnetic blocks reciprocate, Stress concentration on the continuous portions can be mitigated by the depressed portions. Therefore, the elastic planar portions can be prevented from being damaged without becoming large in size.

4 Claims, 8 Drawing Sheets

LINEAR OSCILLATORY ACTUATOR

BACKGROUND OF THE INVENTION

1. Field of the Invention

The present invention relates to a linear oscillatory actuator that, for example, can be used as a drive source of an electric shaver.

2. Description of Related Art

A conventional linear oscillatory actuator is disclosed in a Patent Document 1 (Japanese Patent Application Laid-Open No. 2005-354879). As shown in FIGS. 7 to 9, this linear oscillatory actuator 50 includes a stator block 51 having an electromagnet 52, two moving elements 60 each having a permanent magnet 61 disposed oppositely to the electromagnet 52, two pairs of connecting plates 70 that connect the moving elements 60 with the stator block 51, respectively, and a pair of coupling spring portions 80 that couple the two moving elements 60.

Magnetic pole faces of the electromagnetic 52 in the stator block 51 are disposed at a position opposite to the permanent magnets 61 in the two moving elements 60.

Each of the moving elements 60 includes a moving-side housing 64, and is integrally formed with the pair of connecting plates 70 so as to reciprocate independently in its reciprocating direction (M direction) due to deflection of the pair of connecting plates 70. Both of the permanent magnets 61 of the moving elements 60 are disposed oppositely to the magnetic pole faces of the electromagnet 52 in the stator block 51 with a predetermined gap therebetween. One of the permanent magnet 61 is disposed in reversed polarity to another of the permanent magnet 61, so that they are subject to opposite magnetic forces (an attractive force and a repelling force) caused by a magnetic field produced by the electromagnet 52, respectively. Therefore, opposite drive forces apply to the moving elements 60 in the reciprocating direction (M direction), respectively, when the electromagnet 52 is activated.

The connecting plates 70 in a pair are disposed at both ends of the moving element 60, respectively. The connecting plates 70 are integrally formed with the moving-side member 64 of the moving element 60. Each of the connecting plates 70 includes an upper extending portion 73, a lower extending portion 74, and an elastic planar portion 71 that is formed between the extending portions 73 and 74. The connecting plates 70 are elastic suspensions for supporting the moving element 60. The upper extending portion 73 connects with the moving housing 64, and the lower extending portion 74 connects with a fixed-side base 54 of the stator block 51. The elastic planar portion 71 consists of two spring plates 71a and 71b that are aligned parallel to each other with a predetermined distance, and connects the upper extending portion 73 with the lower extending portion 74. A continuous portion 76 between the upper extending portion 73 and the spring plates 71b (the elastic planar portion 71) is formed into a simple curved shape with a small curvature, as shown in FIGS. 7 and 8.

Each of the coupling spring portions 80 has a C-ring shape and is connected with the pair of moving elements 60 only at its both ends, respectively. Each of the coupling spring portions 80 has a symmetrical shape in a center plane between the pair of moving elements 60.

In the above configuration, polarity generated on the magnetic pole faces of the electromagnetic 52 is changed alternately after the electromagnetic 52 is activated. As a result, the drive forces opposite to each other are generated due to electromagnetic forces between the electromagnetic 52 and the permanent magnets 61, and apply to the pair of moving elements 60 alternately. Therefore, the pair of moving elements 60 reciprocates due to deflection of the connecting plates 70 with opposite phase. In addition, the coupling spring portions 80 apply elastic restoring forces to both of the moving elements 60 to restrict oscillation of the moving elements 60. As a result, fluctuation in the oscillation of the pair of moving elements 60 is restricted, so that the pair of moving elements 60 reciprocates with predetermined constant amplitude.

SUMMARY OF THE INVENTION

However, since the continuous portion 76 of the connecting plate is formed into a simple curved shape with a small curvature, stress concentrates at the continuous portion 76 while the moving element 60 reciprocates. Therefore, the continuous portions 76 (the connecting plates 70) may be damaged due to the stress concentration.

Therefore, it may be possible to form the continuous portions 76 into a curved shape with a large curvature. However, in this case, the connecting plates 70 are subject to protrude toward both sides, so that the actuator becomes large in size.

Therefore, it is an object of the present invention to provide a linear oscillatory actuator that can mitigate stress concentration on continuous portions of its connecting plates (elastic suspensions) while its moving elements reciprocate to prevent the connecting plates from being damaged without becoming large in size.

An aspect of the present invention provides a linear oscillatory actuator that includes a magnetic pole forming portion that includes an electromagnet capable of generating different polarities alternately when activated and a base on which the electromagnet is fixed; at least two magnetic blocks each of which is disposed oppositely to the magnetic pole forming portion and includes a magnet to be attracted or repelled by a polarity generated at the magnetic pole forming portion, and reciprocates relatively to the magnetic pole forming portion; at least two elastic suspensions that support the magnetic blocks reciprocatably, respectively; and at least one coupling spring portion that couples the magnetic blocks reciprocatably. Each of the elastic suspensions includes upper extending portions connected with both sides of each of the magnetic blocks, respectively, lower extending portions connected with both sides of the base of the magnetic pole forming portion, respectively, and elastic planar portions that are integrally provided between the upper extending portions and the lower extending portions, respectively. In addition, depressed portions are formed at continuous portions between the upper extending portions and the elastic planar portions, respectively, and each of the depressed portions is depressed toward each of the magnetic blocks.

According to the aspect of the present invention, the elastic suspensions connect the magnetic blocks with the magnetic pole forming portion, respectively. While the magnetic blocks reciprocate by an activation of the electromagnet of the magnetic pole forming portion, stress applies to the elastic suspensions due to the reciprocation. The elastic suspension includes the upper and lower extending portions, and the elastic planar portion provided between the upper and lower extending portions. In addition, the depressed portion is formed at the continuous portion between the upper extending portion and the elastic planar portion. Therefore, a large curve of the depressed portion is formed at the continuous portion, and the upper extending portion and the elastic planar portion are connected with each other by the large curve. The stress is mitigated at the continuous portion due to the large curve, so that the elastic portions can be prevented from being damaged at the continuous portions.

In addition, since the depressed portions are formed at the continuous portions of the elastic suspension, a molding portion of a die for forming the continuous portion can be made thick. Therefore, strength of the die can be improved.

Further, since the depressed portions are formed so as to be depressed toward the magnetic blocks, the actuator can be prevented from becoming large in size.

It is preferable that each of the depressed portions includes a depressed opposite surface that is depressed inward from an opposite surface of each of the magnetic blocks to each intermediate portion of the elastic planar portions, and a curved surface that extends continuously from an end of the depressed opposite surface to each of the elastic planar portions.

It is further preferable that the curved surface has a sloped surface section thereof near the magnetic blocks.

Alternatively, it is further preferable that the curved surface has a sloped surface section thereof near the elastic planar portions.

DETAILED DESCRIPTION OF THE EMBODIMENT

Figure 1:
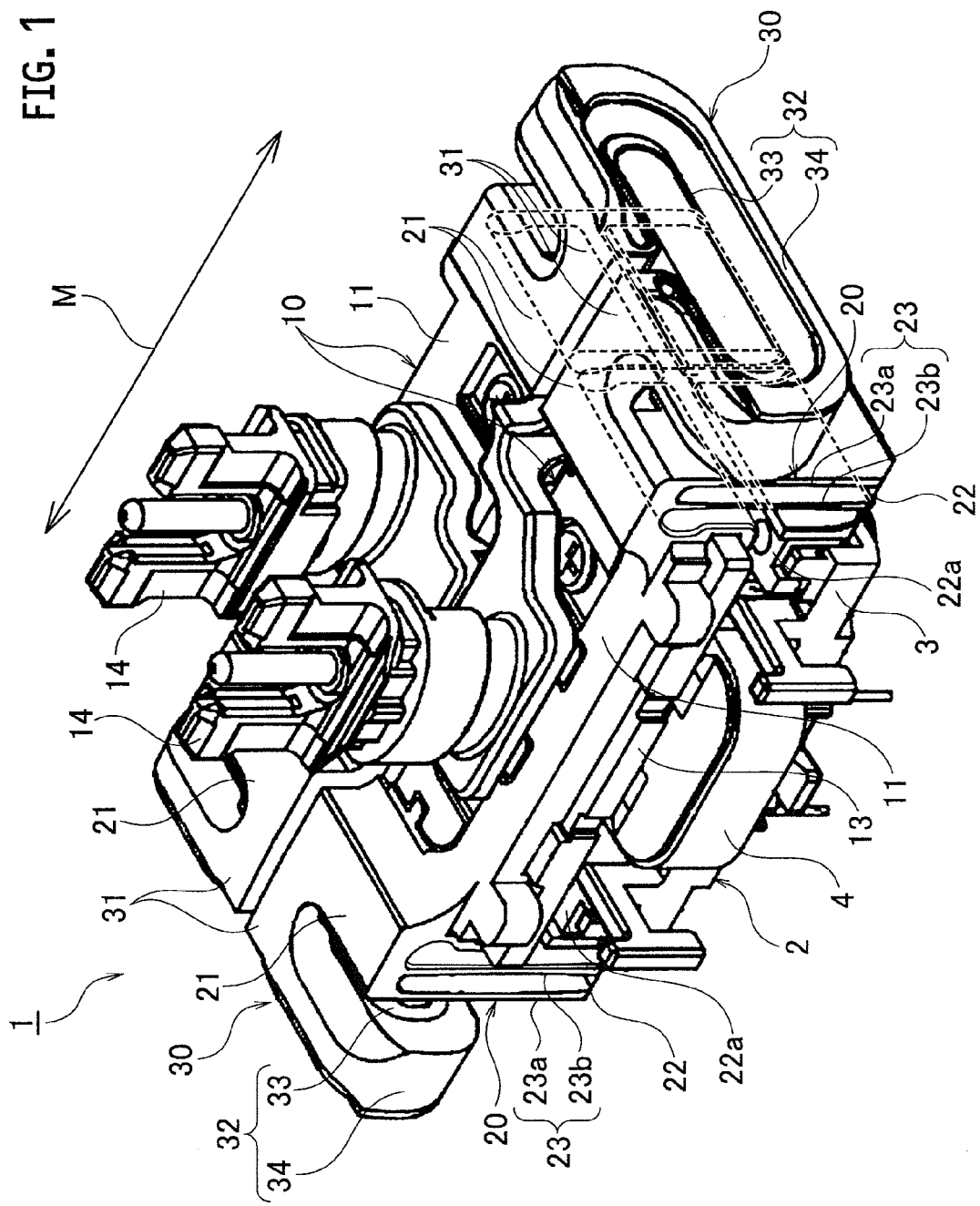
FIG. 1 is a perspective view of a linear oscillatory actuator according to an embodiment.

Hereinafter, a linear oscillatory actuator according to an embodiment will be explained with reference to the drawings.

As shown in FIGS. 1 to 4, the linear oscillatory actuator 1 includes a stator block (magnetic pole forming portion) 2 having an electromagnet 4, two moving elements (magnetic blocks) 10 each having a permanent magnet 12 (see FIG. 2) disposed oppositely to the electromagnet 4, two pairs of connecting plates (elastic suspensions) 20 that connect the moving elements 10 with the stator block 2, respectively, and a pair of coupling spring portions 30 that couple the two moving elements 10. Note that the coupling spring portions 30 are provided in a pair at both sides of the moving elements 10 in a reciprocating direction of the moving elements 10 in the present embodiment, but the coupling spring portion 30 may be provided singularly or in a plurality at any position capable of coupling the moving elements 10 reciprocatably.

The stator block 2 includes a fixed-side base 3 made of synthetic resin. The electromagnet 4 is fixed on the fixed-side base 3. The electromagnet 4 includes a core 5 (see FIG. 4) made of material that can be magnetized, and a coil 7 that is wound around the core 5 with interposing a bobbin 6 made of material that cannot be magnetized. Alternating current is applied to the coil 7. Each of magnetic pole faces 5a of the core 5 is positioned oppositely to the permanent magnets 12 of the two moving elements 10.

The pair of moving element 10 is aligned in a front-back direction with a gap therebetween. Each of the moving elements 10 includes a moving-side housing 11 made of synthetic resin, the permanent magnet 12, and a back yoke 13 made of material that can be magnetized. A drive element 14 is fixed on an upper surface of the moving-side housing 11 by screws or the like. When applying the linear oscillatory actuator 1 to a drive source of an electric shaver, an inner blade (not shown) is attached to the drive element 14.

Each of the moving elements 10 is provided so as to reciprocate independently in its reciprocating direction (M direction) due to deflection of the pair of connecting plates 20. Both of the permanent magnets 12 of the moving elements 10 are disposed oppositely to the magnetic pole faces 5a of the electromagnet 4 with a predetermined gap therebetween. One of the permanent magnet 12 is disposed in reversed polarity to another of the permanent magnet 12, so that they are subject to opposite magnetic forces (an attractive force and a repelling force) caused by a magnetic field produced by the electromagnet 4, respectively. Therefore, opposite drive forces apply to the moving elements 10 in the reciprocating direction (M direction), respectively, when the electromagnet 4 is activated. The back yoke 13 is disposed on an opposite side of the permanent magnet 12 to the electromagnet 4.

The connecting plates 20 in a pair are made of synthetic resin, and integrally formed with the moving-side housing 11. Each of the connecting plates 20 includes an upper extending portion 21, a lower extending portion 22, and an elastic planar portion 23 that is formed between the extending portions 21 and 22. The upper extending portions 21 in a pair are connected with both ends of the moving-side housing 11, respectively. The lower extending portions 22 in a pair are connected to the fixed-side base 3 of the stator block 2. An attachment protruded portion 22a is provided on each of the lower extending portions 22. The attachment protruded portion 22a is fixed to the fixed-side base 3 of the stator block 2 by screws or the like. Therefore, each of the moving elements 10 is supported by the connecting plates 20 in a lifted-up manner.

Figure 2:
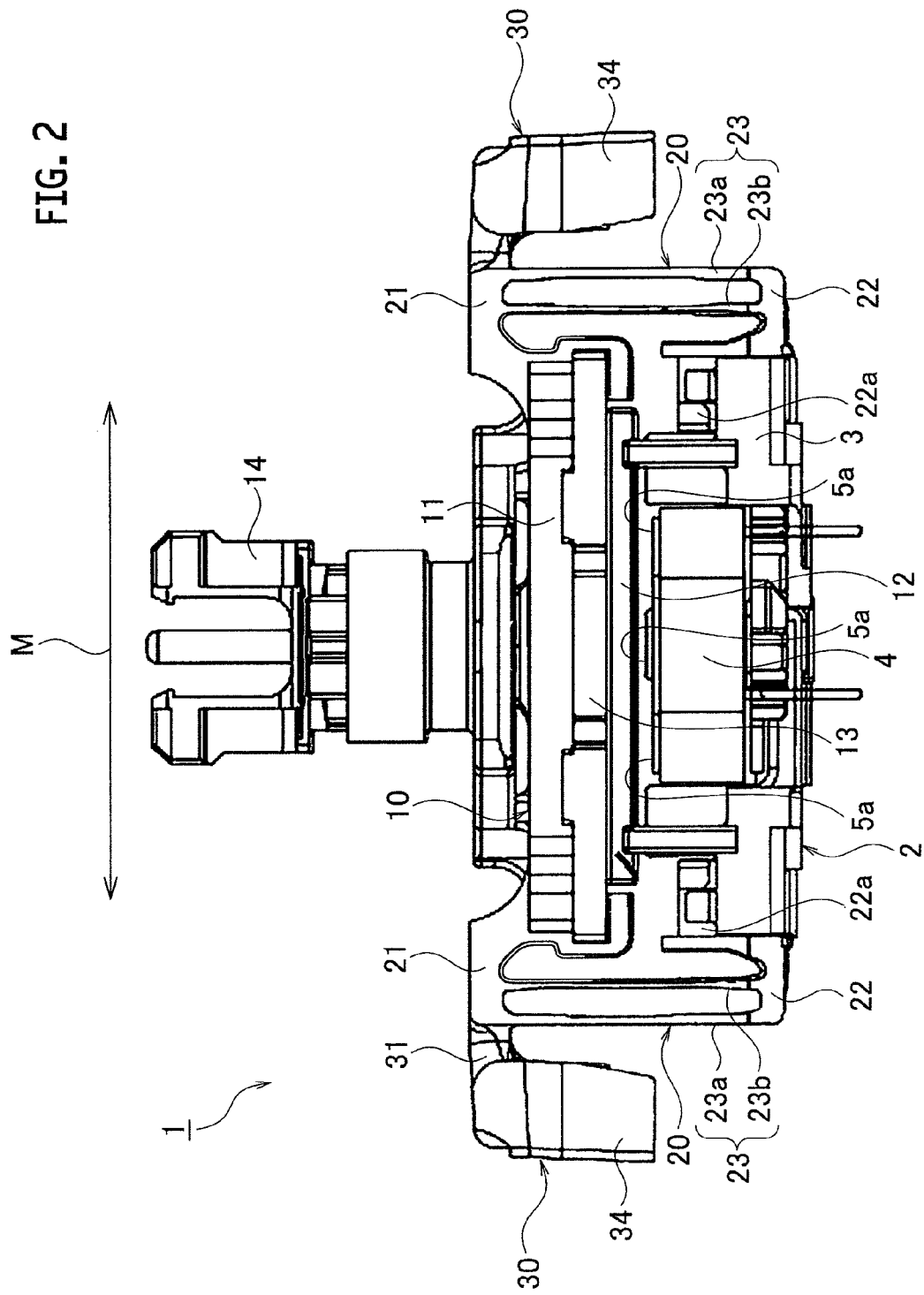
FIG. 2 is a front view of the linear oscillatory actuator.
Figure 3:
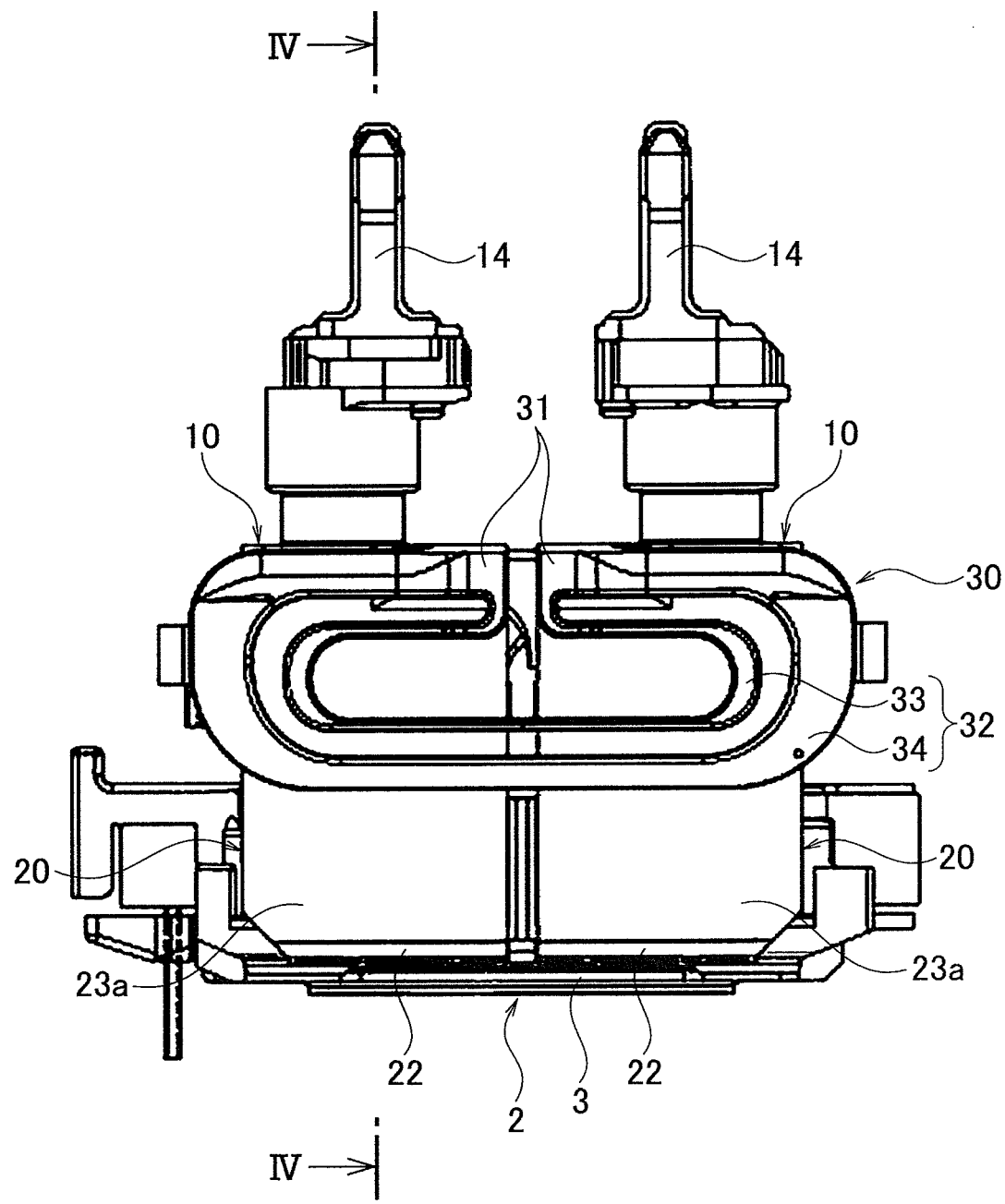
FIG. 3 is a side view of the linear oscillatory actuator.
Figure 4:
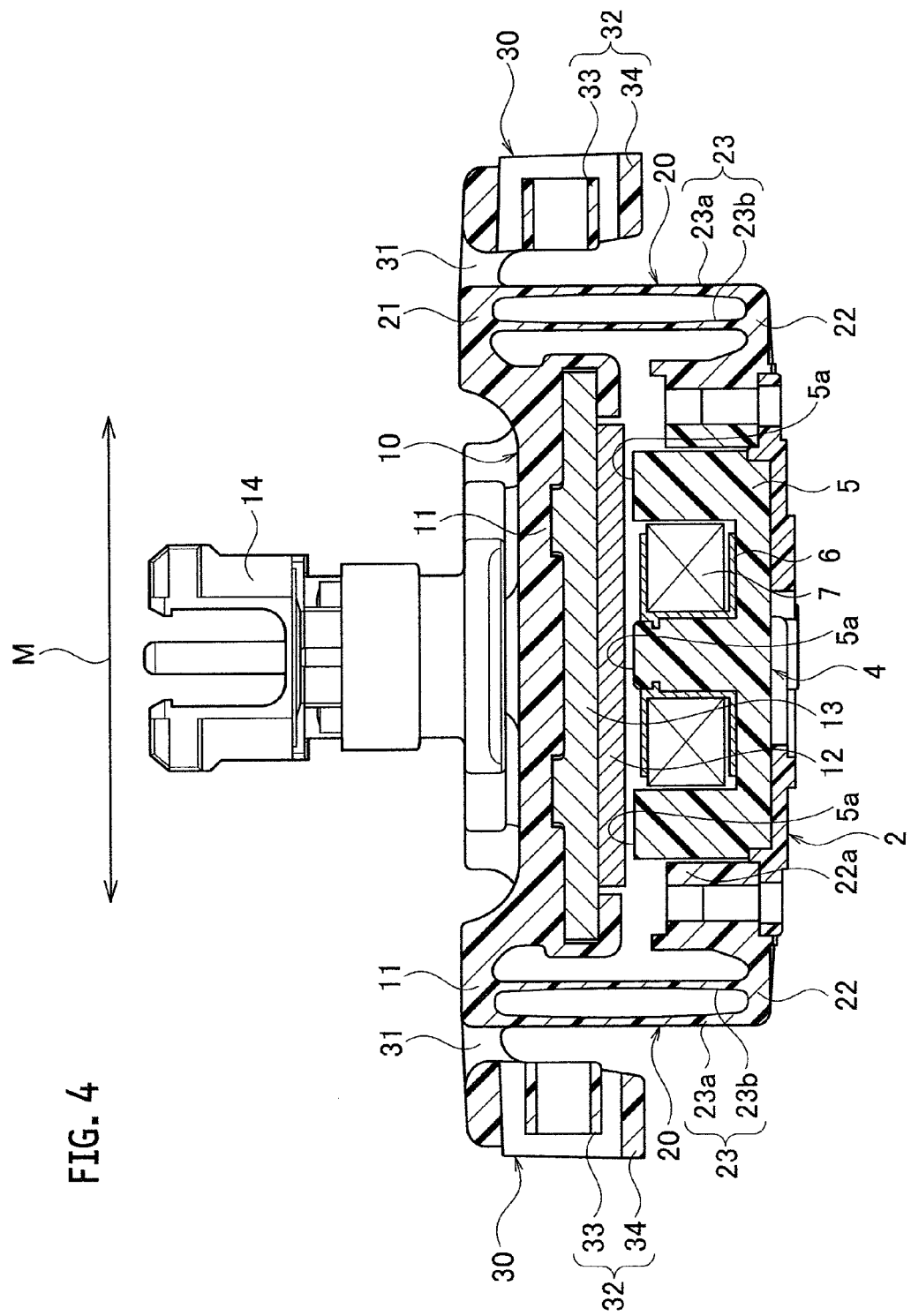
FIG. 4 is a cross-sectional view taken along a line IV-IV shown in FIG. 3.

The elastic planar portion 23 consists of two spring plates 23a and 23b that are aligned parallel to each other with a predetermined distance. The moving element 10 can reciprocate in the reciprocating direction (M direction) due to deflection of the two spring plates 23a and 23b. As shown in FIGS. 2 and 4, each of the spring plates 23a and 23b is planar and formed to have almost the same width as a width of the moving element 10 and the same height as a height from the fixed-side base 3 to the moving element 10. In the elastic planar portion 23, the spring plate 23a is disposed on a side of the coupling spring portion 30 (i.e. outside), and the spring plate 23b is disposed on a side of the moving-side housing 11 (i.e. inside).

Figure 5:
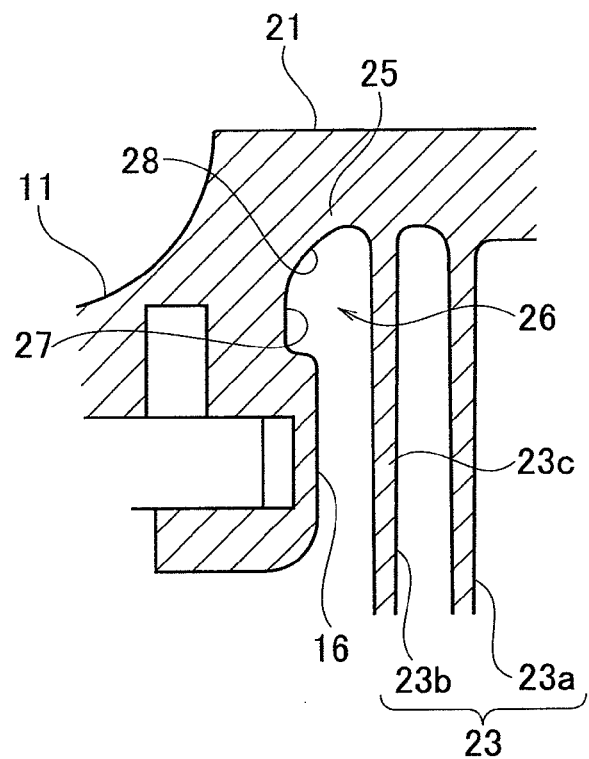
FIG. 5 is an enlarged partial cross-sectional view of a connecting plate in the embodiment.

In the present embodiment, a depressed portion 26 is formed at each continuous portion 25 between the upper extending portion 21 and the spring plate 23b (the elastic planar portion 23) as shown in FIG. 5. The depressed portion 26 is depressed toward the moving element 10 (the moving-side housing 11). The depressed portion 26 is formed of a depressed opposite surface 27 that is depressed inward from an opposite surface 16 of the moving-side housing 11 to an intermediate portion 23c of the spring plate 23b (the elastic planar portion 23), and a curved surface 28 that extends continuously from an end (on a side of the upper extending portion 21) of the depressed opposite surface 27 to the spring plate 23b. The curved surface 28 has its sloped surface section near the moving-side housing 11. In addition, the depressed portion 26 is formed with almost the same width as the width of the moving element 10. Namely, each width of the depressed opposite surface 27 and the curved surface 28 is the same as the moving element 10.

The depressed opposite surface 27 locates inward from the opposite surface 16, and extends along a width direction of the upper extending portion 21. The curved surface 28 is formed continuously from the (upper) end of the depressed opposite surface 27 to the spring plate 23b, and extends along the width direction of the upper extending portion 21. By forming the depressed portion 26 that has the above-described shape at the continuous portion 25 between the upper extending portion 21 and the spring plate 23b, stress concentration on the continuous portion 25 can be mitigated while the moving element 10 reciprocates.

The coupling spring portions 30 in a pair are made of synthetic resin, and integrally formed with the connecting plates 20 and the moving-side housings 11. Each of the coupling spring portions 30 includes two coupling base sections 31 and a spring section 32 disposed between the two coupling base sections 31. The two coupling base sections 31 are fixed to the upper extending portions 21 of the connecting plates 20, respectively. The spring section 32 has an almost frame shape, and consists of an inner spring section 33 on its inner circumferential side and an outer spring section 34 on its outer circumferential side. The inner spring section 33 is integrally formed on an inner circumference of the outer spring section 34 near the moving elements 10, and has almost a half width of the outer spring section 34.

In the above configuration, polarity generated on the magnetic pole faces 5a of the electromagnetic 4 is changed alternately after the electromagnetic 4 is activated. As a result, the drive forces opposite to each other are generated due to electromagnetic forces between the electromagnetic 4 and the permanent magnets 12, and apply to the pair of moving elements 10 alternately. Therefore, the pair of moving elements 10 reciprocates due to deflection of the connecting plates 20 with opposite phase. In addition, the coupling spring portions 30 apply elastic restoring forces to both of the moving elements 10 to restrict oscillation of the moving elements 10. As a result, fluctuation in the oscillation of the pair of moving elements 10 is restricted, so that the pair of moving elements 10 reciprocates with predetermined constant amplitude.

While the moving elements 10 reciprocate, stress caused by the reciprocation of the moving element 10 applies to the upper extending portion 21 of the connecting plate 20. Since the stress transmits to the upper extending portion 21 from the moving-side housing 11 of the moving element 10, the stress applies to the continuous portion 25 of the upper extending portion 21. Since the depressed portion 26 composed of the depressed opposite surface 27 and the curved surface 28 is formed at the continuous portion 25, the stress disperses to an entire of the depressed opposite surface 27 and the curved surface 28. Therefore, the stress that applies to the continuous portion 25 is mitigated, and the connecting plate 20 can be prevented from being damaged at the continuous portion 25 thereof.

In addition, since the depressed portion 26 is formed at the continuous portion 25 of the connecting plate 20, a molding portion of a die for forming the continuous portion 25 can be made thick. Therefore, strength of the die can be improved.

Further, since the depressed portion 26 is formed so as to be depressed toward the moving element 10, the actuator 1 can be prevented from becoming large in size.

Figure 6:
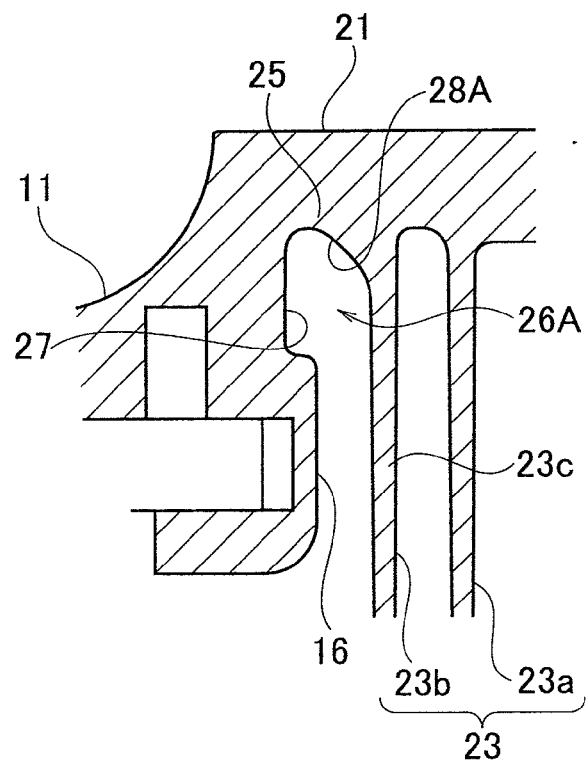
FIG. 6 is an enlarged partial cross-sectional view of a connecting plate in a modified example.
Figure 7:
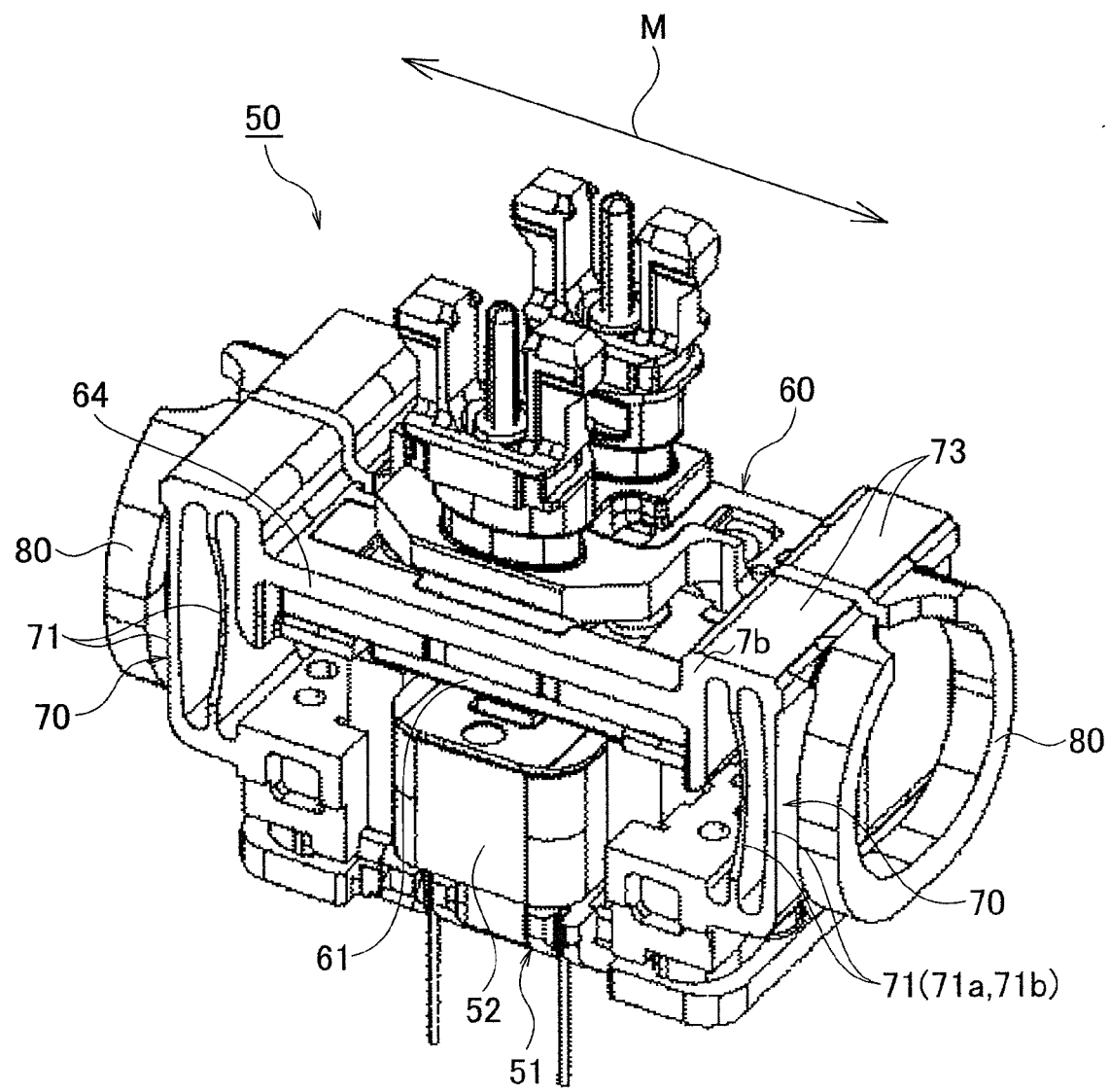
FIG. 7 is a perspective view of a conventional linear oscillatory actuator.
Figure 8:
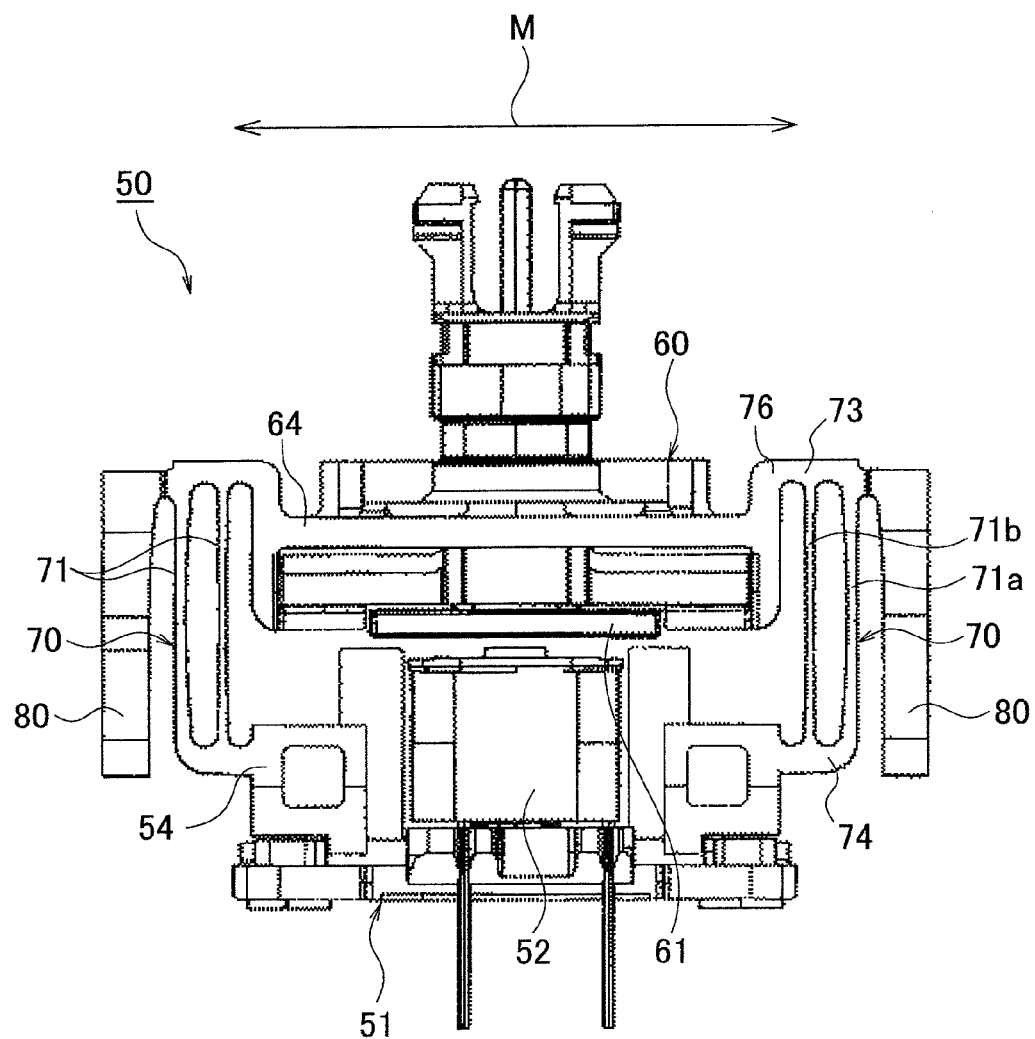
FIG. 8 is a front view of the conventional linear oscillatory actuator.
Figure 9:
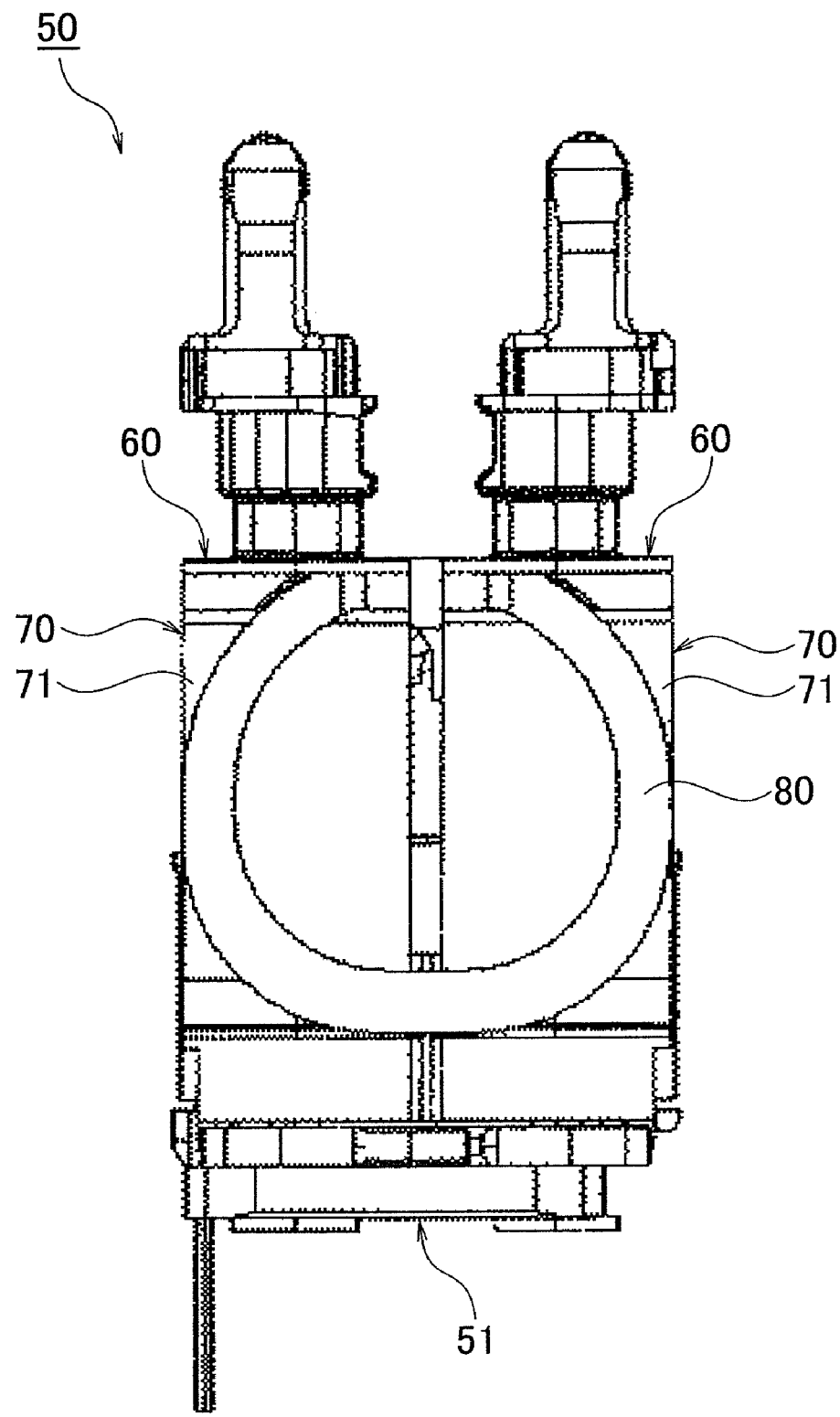
FIG. 9 is a side view of the conventional linear oscillatory actuator.

FIG. 6 shows a modified example of a depressed portion 26A formed at the continuous portion 25. The depressed portion 26A is formed between the upper extending portion 21 and the spring plate 23b similarly to the above-described embodiment shown in FIG. 5, and depressed toward the moving element 10 (the moving-side housing 11). The repressed portion 26A is formed by the depressed opposite surface 27 and a curved portion 28A that extend continuously.

The depressed opposite surface 27 is depressed inward from the opposite surface 16 of the moving-side housing 11 to the intermediate portion 23c of the spring plate 23b, and extends along the width direction of the upper extending portion 21. The curved surface 28A extends continuously from an end (on a side of the upper extending portion 21) of the depressed opposite surface 27 to the spring plate 23b. The curved surface 28A has its sloped surface section near the spring plate 23a. By forming the depressed portion 26A that has the above-described shape at the continuous portion 25 between the upper extending portion 21 and the spring plate 23b, stress concentration on the continuous portion 25 can be mitigated while the moving element 10 reciprocates.

In addition, since the depressed portion 26A is formed at the continuous portion 25 of the connecting plate 20, a molding portion of a die for forming the continuous portion 25 can be made thick. Therefore, strength of the die can be improved.

Although the above-described linear oscillatory actuator 1 can be preferably applied to a drive source of an electric shaver, the actuator 1 can be adapted to other uses. In addition, the magnetic pole forming portion (stator block) 2 that includes the electromagnet 4 is a fixed side and the magnetic blocks (moving elements) 10 that have the permanent magnets 12 are movable sides in the above-described embodiment. However, the magnetic pole forming portion 2 that includes the electromagnet 4 may be a movable side and the magnetic blocks 10 that have the permanent magnets 12 may be fixed sides. Alternatively, the magnetic pole forming portion 2 that includes the electromagnet 4 may be one movable side and the magnetic blocks 10 that have the permanent magnets 12 may be other movable sides.

Although the depressed portion 26 (26A) continuously formed along the entire width of the moving element 10 in the above-described embodiment, it is not needed to form the depressed portion 26 (26A) continuously. The depressed portion 26 (26A) can be formed discontinuously (e.g. intermittently) even if the depressed portion 26 (26A) can mitigate the stress and improve the strength.

In addition, the elastic suspensions (connecting plates) 20, the coupling spring portions 30 and the moving elements 10 are formed integrally in the above-described embodiment. However, the elastic suspensions and the coupling spring portions 30 may be formed separately from the moving elements and then fixed to the moving elements by screws or the like.

Further, the electromagnet 4 is fixed on the fixed-side base 3 in the above-described embodiment. However, the electromagnet may be fixed to the fixed-side base with interposing a spring material.

Furthermore, in a case where the linear oscillatory actuator is used for driving shaving blade(s) in an electric shaver, an inner blade(s) may be reciprocated via the drive element(s), or an outer blade(s) may be reciprocated by one of the plural moving elements.

What is claimed is:

1. A linear oscillatory actuator comprising:
   a magnetic pole forming portion that includes an electromagnet capable of generating different polarities alternately when activated and a base on which the electromagnet is fixed;
   at least two magnetic blocks each of which is disposed oppositely to the magnetic pole forming portion and includes a magnet to be attracted or repelled by a polarity generated at the magnetic pole forming portion, and reciprocates relatively to the magnetic pole forming portion;

at least two elastic suspensions that support the magnetic blocks reciprocatably, respectively; and at least one coupling spring portion that couples the magnetic blocks reciprocatably, wherein each of the elastic suspensions includes upper extending portions connected with both sides of each of the magnetic blocks, respectively, lower extending portions connected with both sides of the base of the magnetic pole forming portion, respectively, and elastic planar portions that are integrally provided between the upper extending portions and the lower extending portions, respectively, and depressed portions are formed at continuous portions between the upper extending portions and the elastic planar portions, respectively, and each of the depressed portions is depressed toward each of the magnetic blocks.

2. The linear oscillatory actuator according to claim 1, wherein each of the depressed portions includes a depressed opposite surface that is depressed inward from an opposite surface of each of the magnetic blocks to each intermediate portion of the elastic planar portions, and a curved surface that extends continuously from an end of the depressed opposite surface to each of the elastic planar portions.

3. The linear oscillatory actuator according to claim 2, wherein the curved surface has a sloped surface section thereof near the magnetic blocks.

4. The linear oscillatory actuator according to claim 2, wherein the curved surface has a sloped surface section thereof near the elastic planar portions.

* * * * *